US012197683B2

(12) United States Patent
Zhang et al.

(10) Patent No.: US 12,197,683 B2
(45) Date of Patent: Jan. 14, 2025

(54) TOUCH PANEL AND MOBILE TERMINAL

(71) Applicant: Wuhan China Star Optoelectronics Semiconductor Display Technology Co., Ltd., Wuhan (CN)

(72) Inventors: Zhen Zhang, Wuhan (CN); Jian Ye, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/602,791

(22) PCT Filed: Sep. 1, 2021

(86) PCT No.: PCT/CN2021/115891
§ 371 (c)(1),
(2) Date: Oct. 11, 2021

(87) PCT Pub. No.: WO2023/019643
PCT Pub. Date: Feb. 23, 2023

(65) Prior Publication Data
US 2024/0248569 A1 Jul. 25, 2024

(30) Foreign Application Priority Data
Aug. 19, 2021 (CN) .......................... 202110953941.7

(51) Int. Cl.
*G06F 3/044* (2006.01)
(52) U.S. Cl.
CPC .......... *G06F 3/0443* (2019.05); *G06F 3/0446* (2019.05)

(58) Field of Classification Search
CPC ............................ G06F 3/0443; G06F 3/0446
See application file for complete search history.

(56) References Cited

U.S. PATENT DOCUMENTS

| 11,455,006 B2* | 9/2022 | Hong | H10K 59/131 |
| 11,614,842 B2* | 3/2023 | Bang | G06F 3/0446 |
| | | | 345/173 |

(Continued)

FOREIGN PATENT DOCUMENTS

| CN | 111651091 A | 9/2020 |
| CN | 111651092 A | 9/2020 |

(Continued)

OTHER PUBLICATIONS

International Search Report in International application No. PCT/CN2021/115891, mailed on May 17, 2022.

(Continued)

*Primary Examiner* — Christopher E Leiby
(74) *Attorney, Agent, or Firm* — Nathan & Associates; Menachem Nathan

(57) ABSTRACT

The present application discloses a touch panel and a mobile terminal; each of first electrode groups of a touch layer of the touch panel includes a first main electrode group and first branch electrodes, and each of second electrode groups includes a second main electrode group and a plurality of second branch electrodes, while the first branch electrodes are provided with first openings and the second branch electrodes are provided with second openings, so as to reduce a total facing area of both the first electrode groups and the second electrode groups and a cathode layer, thereby improving reliability of an operation of the touch panel.

18 Claims, 9 Drawing Sheets

(56) References Cited

U.S. PATENT DOCUMENTS

| | | | | |
|---|---|---|---|---|
| 2011/0007020 A1* | 1/2011 | Hong | ................... | G06F 3/0446 |
| | | | | 345/174 |
| 2012/0133613 A1* | 5/2012 | Chen | ................... | G06F 3/0443 |
| | | | | 345/174 |
| 2014/0062915 A1* | 3/2014 | Kim | .................. | G06F 3/041 |
| | | | | 345/173 |
| 2015/0077383 A1* | 3/2015 | Kang | ................... | G06F 3/0446 |
| | | | | 345/174 |
| 2015/0234495 A1* | 8/2015 | Lo | ........................ | G06F 3/045 |
| | | | | 345/174 |
| 2015/0253907 A1* | 9/2015 | Elias | ..................... | G06F 3/045 |
| | | | | 345/174 |
| 2015/0313006 A1* | 10/2015 | Lane | ................ | H01L 21/76895 |
| | | | | 174/250 |
| 2016/0282993 A1* | 9/2016 | Song | ................... | G06F 3/0446 |
| 2017/0139525 A1* | 5/2017 | Jo | ........................ | G06F 3/046 |
| 2017/0193275 A1 | 7/2017 | Liu | | |
| 2019/0064960 A1* | 2/2019 | Na | ..................... | H10K 77/111 |
| 2020/0133409 A1* | 4/2020 | Tanemura | ............ | G06F 3/0443 |
| 2021/0173524 A1 | 6/2021 | Deng et al. | | |
| 2021/0173525 A1* | 6/2021 | Han | ..................... | G06F 3/0448 |
| 2022/0320237 A1* | 10/2022 | Liu | ....................... | G02F 1/1333 |
| 2022/0413677 A1* | 12/2022 | Zhang | .................. | G06F 3/0443 |
| 2023/0043343 A1* | 2/2023 | Cho | ...................... | G06F 3/0412 |

FOREIGN PATENT DOCUMENTS

| | | |
|---|---|---|
| CN | 212624007 A | 2/2021 |
| CN | 112506381 A | 3/2021 |
| CN | 113126822 A | 7/2021 |

OTHER PUBLICATIONS

Written Opinion of the International Search Authority in International application No. PCT/CN2021/115891 , mailed on May 17, 2022.

Chinese Office Action issued in corresponding Chinese Patent Application No. 202110953941.7 dated Mar. 31, 2023, pp. 1-7.

* cited by examiner

TOUCH PANEL AND MOBILE TERMINAL

BACKGROUND OF DISCLOSURE

Field of Disclosure

The present disclosure relates to a field of display technology, in particular to a touch panel and a mobile terminal.

Description of Prior Art

Flexible display technology enables a screen to be folded. In order to achieve a better folding effect, it is necessary to make a cover plate of the screen thin enough.

However, for a mutual-capacitance touch panel with touch electrodes located above an encapsulation layer, a thin encapsulation layer may cause a distance between the touch electrodes and a cathode layer to be too close, so that a parasitic capacitance between each of the touch electrodes and the cathode layer is large, and a resistance and capacitance (RC) loading of each of the touch electrodes is large. Therefore, electrical signal attenuation on the touch electrodes is relatively serious, and reliability of an operation of the touch panel is reduced.

In summary, it is necessary to provide a touch panel and a mobile terminal that can improve the reliability of the operation of the mutual-capacitance touch panel.

SUMMARY OF DISCLOSURE

Embodiments of the present disclosure provide a touch panel and a mobile terminal to solve a problem that a parasitic capacitance between a conventional electrode and a cathode layer is large, resulting in lower reliability of an operation of the touch panel.

An embodiment of the present disclosure provides a touch panel, comprising a touch layer, wherein the touch layer comprises:
  a plurality of first electrode groups extending in a first direction and arranged in a second direction, wherein each of the first electrode groups comprises a first main electrode group and a plurality of first branch electrodes connected to two sides of the first main electrode group, and at least one of the first branch electrodes is provided with a first opening: and
  a plurality of second electrode groups extending in the second direction and arranged in the first direction, wherein any of the second electrode groups and any of the first electrode groups intersect and are insulated, each of the second electrode groups comprises a second main electrode group and a plurality of second branch electrodes connected to two sides of the second main electrode group, and at least one of the second branch electrodes is provided with a second opening;
  wherein the plurality of first branch electrodes extend in the second direction, and a size of the first branch electrodes along the first direction in a direction away from the first main electrode group sequentially assume a decreasing trend and an increasing trend.

In one embodiment, the plurality of first electrode groups and the plurality of second electrode groups intersect to form a plurality of touch units, the plurality of touch units are arranged in the first direction and the second direction, and each of the touch units comprises a first electrode and a second electrode, and the second electrode is disposed around the first electrode:

in the first direction, every two adjacent first electrodes within the plurality of touch units are electrically connected to form a corresponding first electrode group, and two second electrodes within the two adjacent touch units are insulated;
in the second direction, every two adjacent second electrodes within the plurality of touch units are electrically connected to form a corresponding second electrode group, and two first electrodes within the two adjacent touch units are insulated.

In one embodiment, each first electrode comprises a first main electrode and the plurality of first branch electrodes connected to both sides of the first main electrode, and the second electrode comprises a second main electrode and the plurality of second branch electrodes connected to both sides of the second main electrode; and
  in each of the touch units, the plurality of second branch electrodes are disposed around the plurality of first branch electrodes.

In one embodiment, an edge of each of the first branch electrodes is provided with a plurality of protrusions arranged at intervals, an edge of each of the second branch electrodes disposed opposite to the first branch electrode is provided with a plurality of recesses arranged at intervals, and the plurality of recesses and the plurality of protrusions are arranged in a complementary manner.

In one embodiment, a maximum size of the protrusions in a protruding direction is not less than a size of one sub-pixel.

In one embodiment, in each of the touch units, each of the first branch electrodes extends from a corresponding first main electrode to the second direction, and each of the second branch electrodes extends from a corresponding second main electrode to the first direction.

In one embodiment, each of the first branch electrodes comprises two first sub-branch electrodes axially symmetrical and connected, and a symmetry axis of the two first sub-branch electrodes is parallel to the first direction.

In one embodiment, each of the touch units comprises four repeating units arranged in a matrix, two repeating units in the first direction are axially symmetric, and two repeating units in the second direction are axially symmetric:
  wherein each of the second branch electrodes comprises two second sub-branch electrodes axially symmetrical, a symmetry axis of the two second sub-branch electrodes is parallel to the second direction, the two second sub-branch electrodes are respectively located in an area defined by edges of the two first sub-branch electrodes and the repeating units, and each of the second branch electrodes further comprises:
  a connection electrode, wherein one end of the connection electrode is connected to one end of one of the second sub-branch electrodes away from the first main electrode, and the other end of the connection electrode is connected to one end of the other of the second sub-branch electrodes away from the first main electrode.

In one embodiment, in each of the touch units, the second main electrode comprises two sub-electrodes located on both sides of the first main electrode, the two sub-electrodes are electrically connected by a bridge portion located on the first main electrode, and the bridge portion is insulated from the first main electrode.

In one embodiment, a width of a portion of the first main electrode that intersects the bridge portion is less than a width of a portion of the first main electrode that does not intersect the bridge portion.

In one embodiment, a minimum value of widths of the first branch electrodes and a minimum value of widths of the second branch electrodes are both greater than a size of two sub-pixels.

In one embodiment, the touch layer further comprises:
at least one first dummy electrode, wherein at least one of the at least one first opening or the at least one second opening is provided with the first dummy electrode, and the first dummy electrode is insulated from the plurality of first electrode groups and the plurality of second electrode groups.

In one embodiment, the touch layer further comprises:
at least one second dummy electrode, wherein the second dummy electrode is disposed between the at least one of the first branch electrodes and the at least one of the second branch electrodes, and the second dummy electrode is insulated from the plurality of first electrode groups and the plurality of second electrode groups.

In one embodiment, the first electrode groups and the second electrode groups are formed of a metal grid, and the first electrode groups are insulated from the second electrode groups through fractures of the metal grid.

An embodiment of the present disclosure provides a mobile terminal, wherein the mobile terminal comprises a terminal body and a touch panel, wherein the terminal body and the touch panel are integrated, and the touch panel comprises a touch layer, and the touch layer comprises:
a plurality of first electrode groups extending in a first direction and arranged in a second direction, wherein each of the first electrode groups comprises a first main electrode group and a plurality of first branch electrodes connected to two sides of the first main electrode group, and at least one of the first branch electrodes is provided with a first opening: and
a plurality of second electrode groups extending in the second direction and arranged in the first direction, wherein any of the second electrode groups and any of the first electrode groups intersect and are insulated, each of the second electrode groups comprises a second main electrode group and a plurality of second branch electrodes connected to two sides of the second main electrode group, and at least one of the second branch electrodes is provided with a second opening;
wherein the plurality of first branch electrodes extend in the second direction, and a size of the first branch electrodes along the first direction in a direction away from the first main electrode group sequentially assume a decreasing trend and an increasing trend.

In the mobile terminal of the present disclosure, the plurality of first electrode groups and the plurality of second electrode groups intersect to form a plurality of touch units, the plurality of touch units are arranged in the first direction and the second direction, each of the touch units comprises a first electrode and a second electrode, and the second electrode is disposed around the first electrode:
in the first direction, every two adjacent first electrodes within the plurality of touch units are electrically connected to form a corresponding first electrode group, and two second electrodes within the two adjacent touch units are insulated; and
in the second direction, every two adjacent second electrodes within the plurality of touch units are electrically connected to form a corresponding second electrode group, and two first electrodes within the two adjacent touch units are insulated.

In the mobile terminal of the present disclosure, each first electrode comprises a first main electrode and the plurality of first branch electrodes connected to both sides of the first main electrode, and the second electrode comprises a second main electrode and the plurality of second branch electrodes connected to both sides of the second main electrode; and
in each of the touch units, the plurality of second branch electrodes are disposed around the plurality of first branch electrodes.

In the mobile terminal of the present disclosure, an edge of each of the first branch electrodes is provided with a plurality of protrusions arranged at intervals, an edge of each of the second branch electrodes disposed opposite to the first branch electrodes is provided with a plurality of recesses arranged at intervals, and the plurality of recesses and the plurality of protrusions are arranged in a complementary manner.

In the mobile terminal of the present disclosure, in each of the touch units, each of the first branch electrodes extends from a corresponding first main electrode to the second direction, and each of the second branch electrodes extends from a corresponding second main electrode to the first direction.

In the mobile terminal of the present disclosure, each of the first branch electrodes comprises two first sub-branch electrodes axially symmetrical and connected, and a symmetry axis of the two first sub-branch electrodes is parallel to the first direction.

The touch panel and the mobile terminal provided in the embodiments of the present disclosure, the touch panel comprises the plurality of first electrode groups and the plurality of second electrode groups, the plurality of first electrode groups extend in the first direction and arranged in the second direction, each of the first electrode groups comprises the first main electrode group and the plurality of first branch electrodes connected to two sides of the first main electrode group, the plurality of second electrode groups extend in the second direction and arranged in the first direction, any one of the second electrode groups and any one of the first electrode groups intersect and are insulated, each of the second electrode groups comprises the second main electrode group and the plurality of second branch electrodes connected to two sides of the second main electrode group. In the embodiments, the first opening is provided in at least one of the first branch electrodes, and the second opening is provided in at least one of the second branch electrodes, so that a total facing area of the first electrode groups, the second electrode groups, and the cathode layer is reduced, so that parasitic capacitance between the first electrode groups, the second electrode groups, and the cathode layer is reduced, a RC loading of the first electrode groups and the second electrode groups is reduced, electrical signal attenuation on the first electrode groups and the second electrode groups is alleviated, and reliability of the touch panel operation is improved.

DETAILED DESCRIPTION OF EMBODIMENTS

In order to make purpose, technical solutions, and effects of the present disclosure clear, the following further describes the present disclosure in detail with reference to the accompanying drawings and embodiments. It should be understood that specific embodiments described here are only used to explain the present disclosure, and are not used to limit the present disclosure.

For a mutual-capacitance touch panel with touch electrodes located above an encapsulation layer, a cathode layer is located below the encapsulation layer, so that a thickness of the encapsulation layer determines a distance between the touch electrodes and the cathode layer. With development of a light and thin encapsulation layer, the distance between the touch electrodes and the cathode layer is too close, so that a parasitic capacitance between each of the touch electrodes and the cathode layer is large, and an RC loading of each of the touch electrodes is large. Therefore, electrical signal attenuation on the touch electrodes is relatively serious, and reliability of an operation of the touch panel is reduced. The present disclosure proposes following technical solutions based on above technical problems.

The present disclosure provides a touch panel including, but not limited to, following embodiments and combinations of the following embodiments.

Figure 1:
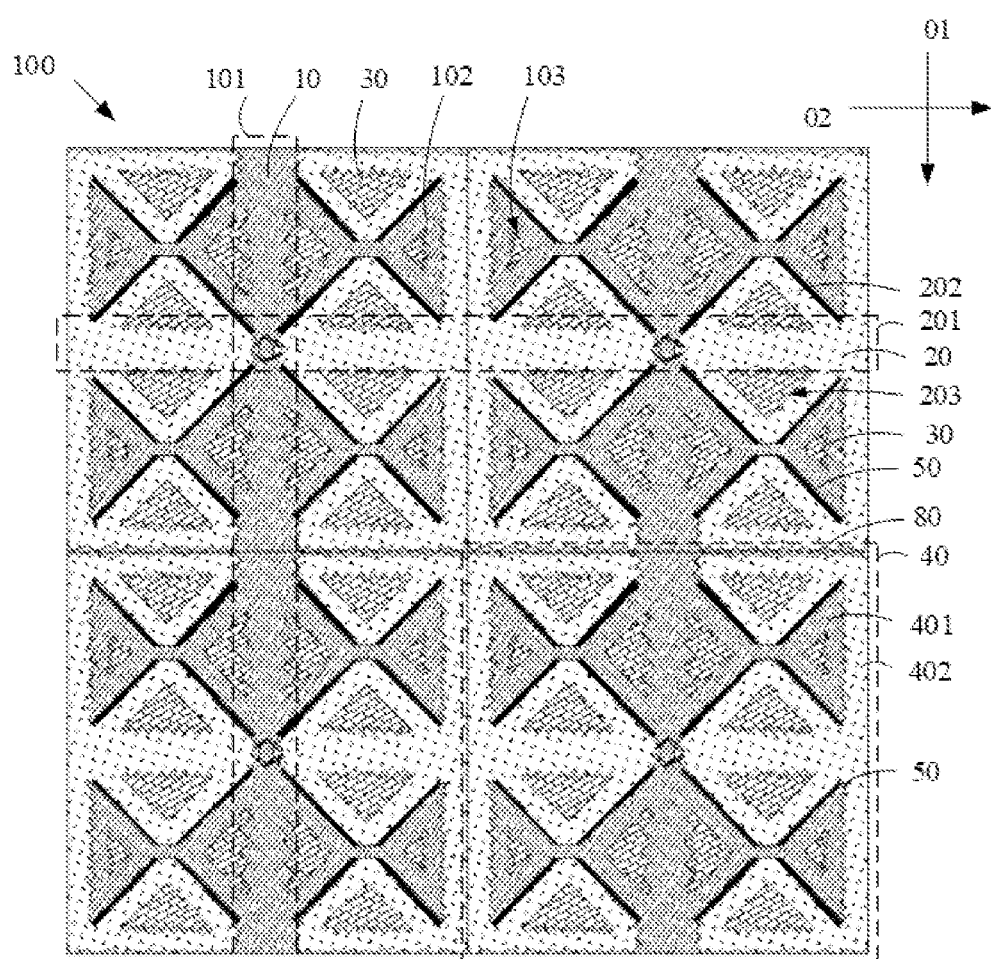
FIG. 1 is a schematic top view of a first embodiment of a touch layer according to an embodiment of the present disclosure.

In one embodiment, as shown in FIG. 1, the touch panel comprises a touch layer 100, which comprises: a plurality of first electrode groups 10 extending in a first direction 01 and arranged in a second direction 02, wherein each of the first electrode groups 10 comprises a first main electrode group 101 and a plurality of first branch electrodes 102 connected to two sides of the first main electrode group 101, and at least one of the first branch electrodes 102 is provided with a first opening 103: a plurality of second electrode groups 20 extending in the second direction 02 and arranged in the first direction 01, wherein any of the second electrode groups 20 and any of the first electrode groups 10 intersect and are insulated from each other, each of the second electrode groups 20 comprises a second main electrode group 201 and a plurality of second branch electrodes 202 connected to two sides of the second main electrode group 201, and at least one of the second branch electrodes 202 is provided with a second opening 203: wherein the plurality of first branch electrodes 102 extend in the second direction 02, and a size of the first branch electrodes 102 along the first direction 01 in a direction away from the first main electrode group 101 successively assume a decreasing trend and an increasing trend.

Wherein, the first direction 01 may be, but is not limited to, a vertical upward direction or a vertical downward direction, and the second direction 02 may be, but is not limited to, a horizontal left direction or a horizontal right direction. Here, the first direction 01 being the vertical upward direction or the vertical downward direction, and the second direction being the horizontal left direction or the horizontal right direction are taking as examples for illustration. That is, the plurality of first electrode groups 10 extend in the vertical direction and are arranged in the horizontal direction, and the plurality of second electrode groups 20 extend in the horizontal direction and are arranged in the vertical direction. Specifically, two adjacent first electrode groups 10 are insulated from each other, and two adjacent second electrode groups 20 are insulated from each other. Further, a non-uniform arrangement of the sizes of the first branch electrodes 102 in the first direction can complicate patterns of the first electrode groups 10 and increase peripheral paths of the first branch electrodes 102. The second branch electrodes 202 and the first branch electrodes 102 are arranged in a same layer, which is advantageous to increase a facing area of the second branch electrodes 202 and the first branch electrodes 102. The first electrode groups 10 and the second electrode groups 20 are further provided, which further increases parasitic capacitance between a second electrode 402 and a first electrode 401, and also effectively increase a capacitance variation value of the parasitic capacitance between the second electrode 402 and the first electrode 401.

It should be noted that the first opening 103 provided in at least one of the first branch electrodes 102 can reduce an area of projection of the plurality of first electrode groups 10 on the cathode layer, that is, an area of the plurality of first electrode groups 10 facing the cathode layer is reduced, and parasitic capacitance between the plurality of first electrode groups 10 and the cathode layer is reduced, so that an RC loading of the plurality of first electrode groups 10 is reduced, and electrical signal attenuation on the plurality of first electrode groups 10 is alleviated. Similarly, this technical solution further alleviates electrical signal attenuation on the plurality of second electrode groups 20. Further, each of the first branch electrodes 102 may be provided with the first opening 103, and each of the second branch electrodes 202 may be provided with the second opening 203. According to the above analysis, the larger a total area of the plurality of first openings 103 and the plurality of second openings 203, the more obvious the electrical signal attenuation on the plurality of first electrode groups 10 and the plurality of second electrode groups 20.

It should be noted that in this embodiment, the plurality of first branch electrodes 102 connected to both sides of each first main electrode group 101 are provided, and impedance of each of the first electrode groups 101 can be reduced as compared with providing only the first main electrode group 101. Similarly, in this embodiment, impedance of each of the second electrode groups 20 can be reduced, thereby reducing the RC loading of the plurality of first electrode groups 10 and the RC loading of the plurality of second electrode groups 20. Further, in this embodiment, the first openings 103 are defined in the first branch electrodes 102, and the second openings 203 are defined in the second branch electrodes 202, thereby preventing defining openings in the first main electrode groups 101 and the second main electrode groups 201 to excessively increase the impedance of the first electrode groups 10 and the second electrode groups 20. That is, in this embodiment, the electrical signal attenuation on both the plurality of first electrode groups 10 and the plurality of second electrode groups 20 is alleviated, and the impedance of the first electrode groups 10 and the plurality of second electrode groups 20 can be minimally increased, and then the RC loading of the plurality of first electrode groups 10 and the RC loading of the plurality of second electrode groups 20 are further reduced.

Figure 2:
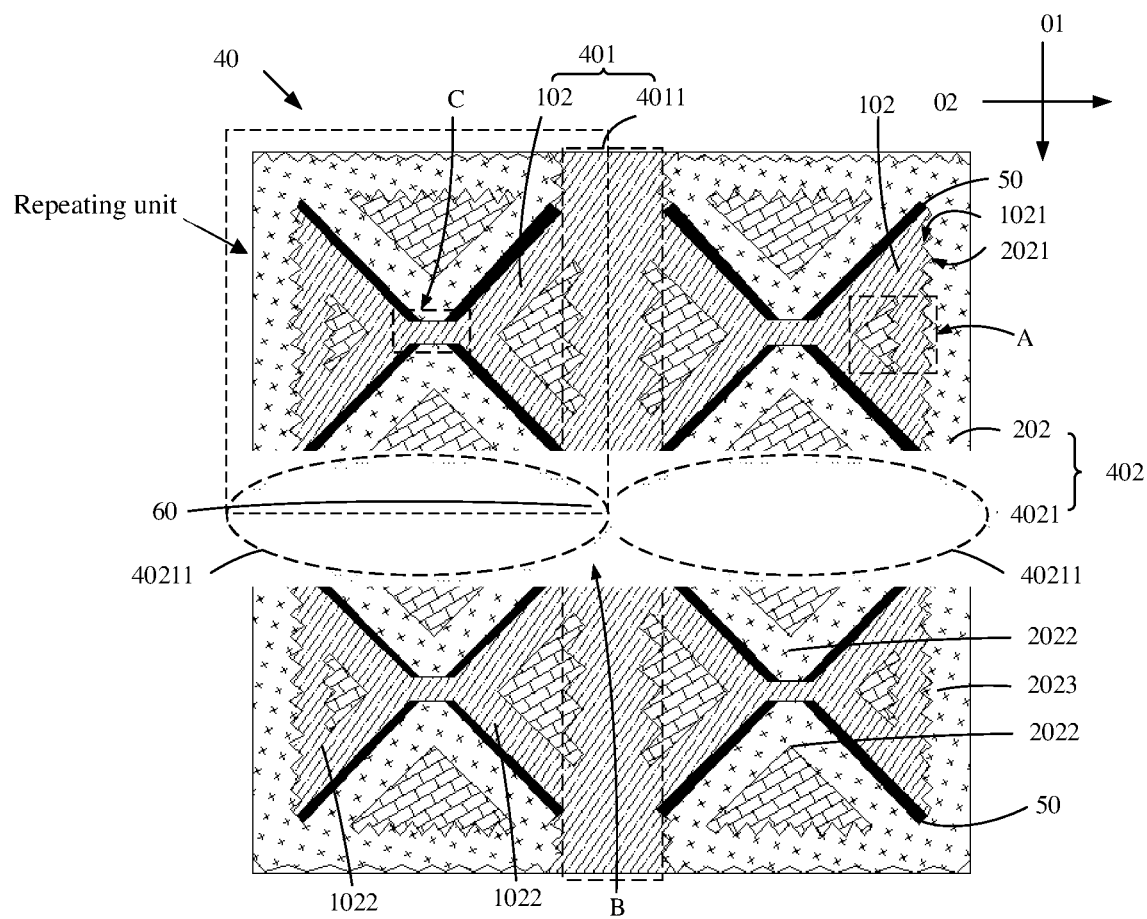
FIG. 2 is a schematic top view of a second embodiment of a touch layer according to an embodiment of the present disclosure.

In an embodiment, as shown in FIGS. 1 and 2, the plurality of first electrode groups 10 and the plurality of second electrode groups 20 intersect to form a plurality of touch units 40, the plurality of touch units 40 are arranged in the first direction 01 and the second direction 02, and each of the touch units 40 comprises the first electrode 401 and the second electrode 402 disposed around the first electrode 401. In the first direction 01, each two adjacent first electrodes 401 in the plurality of touch units 40 are electrically connected to form a corresponding one first electrode group 10, and two second electrodes 402 in two adjacent touch units 40 are insulated from each other. In the second direction 02, each two adjacent second electrodes 402 in the plurality of touch units 40 are electrically connected to form a corresponding one second electrode group 20, and two first electrodes 401 in two adjacent touch units 40 are insulated.

Wherein, the first direction 01 being a vertical upward direction or a vertical downward direction, and the second direction being a horizontal left direction or a horizontal right direction are taking as examples for illustration. That is, the plurality of touch units 40 may be arranged in a matrix in the vertical direction and the horizontal direction. It can be understood that, in this embodiment, the plurality of first electrode groups 10 and the plurality of second electrode groups 20 are arranged as the plurality of touch control units 40 arranged in a matrix, that is, each of the touch units 40 may serve as a touch identification unit, and a touch layer may comprise a plurality of touch identification units arranged in an array. Wherein, in each of the touch units 40, the second electrode 402 is arranged around the first electrode 401, that is, an outer edge of the first electrode 401 is surrounded by an outer edge of the second electrode 402, a facing area of the second electrode 402 and the first electrode 401 is effectively increased, thereby increasing parasitic capacitance between the second electrode 402 and the first electrode 401, and also increasing a capacitance variation value of the parasitic capacitance between the second electrode 402 and the first electrode 401.

Figure 3:
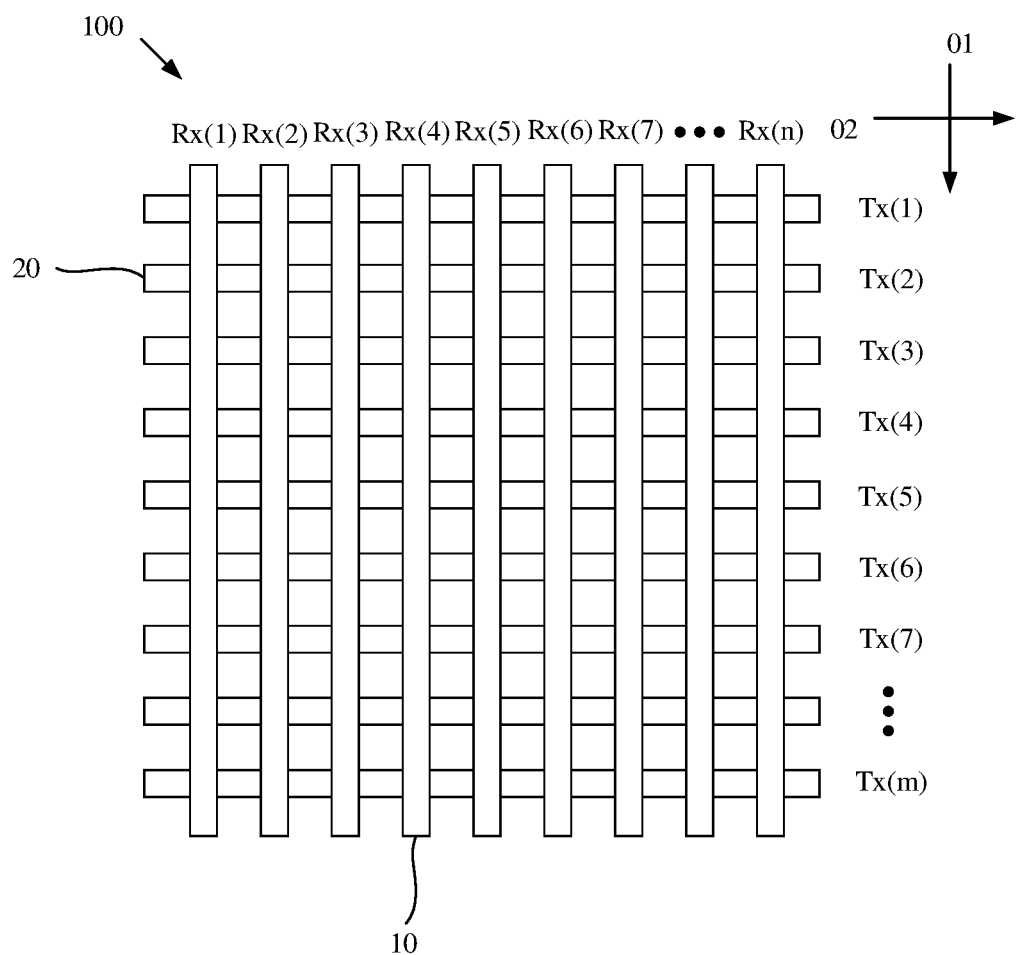
FIG. 3 is a schematic top view of a third embodiment of a touch layer according to an embodiment of the present disclosure.

Specifically, as shown in FIG. 3, the touch layer 100 may comprise n first electrode groups 10 arranged in the second direction 02, and two adjacent first electrode groups 10 are insulated from each other. As shown in FIG. 1, each first electrode group 10 may comprise m first electrodes 401 arranged in the second direction 02. As shown in FIG. 3, the touch display panel 100 may further comprise m second electrode groups 20 arranged in the first direction 01, and two adjacent second electrode groups 20 are insulated from each other. As shown in FIG. 1, each second electrode group 20 may comprise n second electrodes 402 arranged in the second direction 02. For example, when the first electrodes 401 are touch sensing electrodes Rx and the second electrodes 402 are touch emitting electrodes Tx, the first electrode group 10 of a first column to the first electrode group 10 of an n-th column are sequentially Rx(1), Rx(2), . . . , Rx(n), the second electrode group 20 of a first row to the second electrode group 20 of an m-th row are sequentially Tx(1), Tx(2) . . . TX(m).

Figure 4:
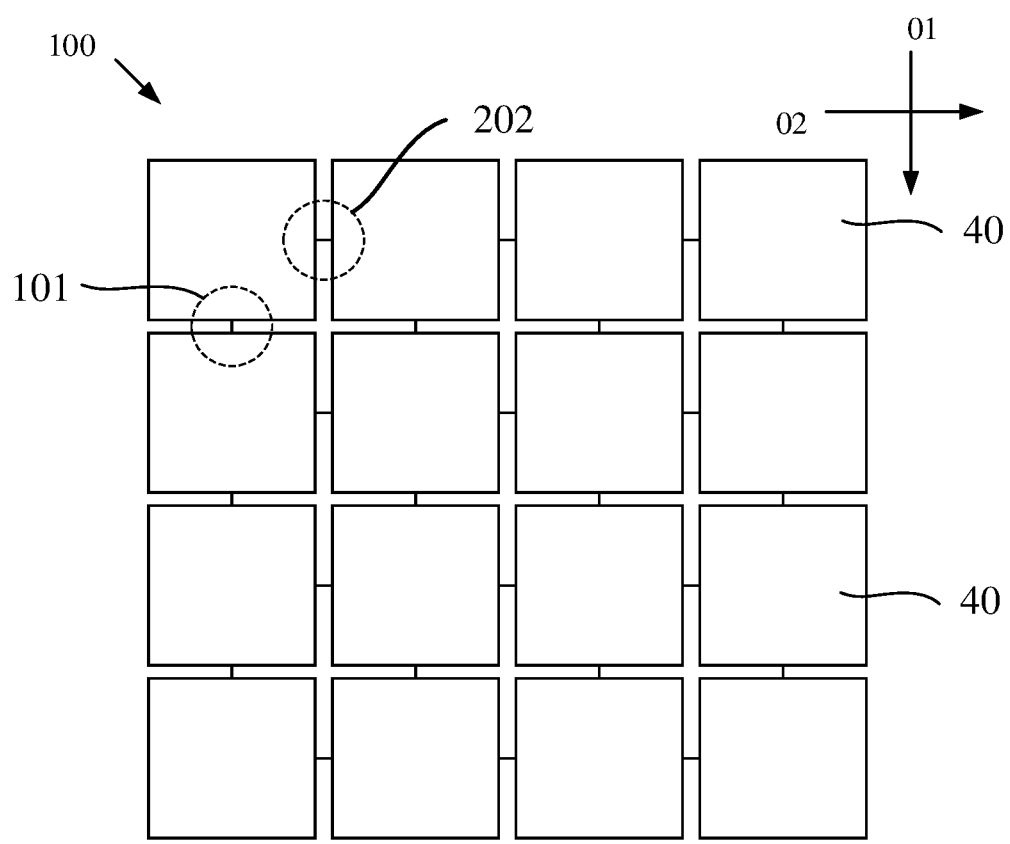
FIG. 4 is a schematic top view of a fourth embodiment of a touch layer according to an embodiment of the present disclosure.

Specifically, as shown in FIG. 4, the touch layer 100 may comprise a plurality of the touch units 40 disposed in the first direction 01 and the second direction 02. As shown in FIG. 1, in the second direction 02, the first electrodes 401 in adjacent two touch units 40 are insulated from each other, and the second electrodes 402 in two adjacent touch units 40 are electrically connected. In the first direction 01, the second electrodes 402 in two adjacent touch units are insulated, and the first electrodes 401 in two adjacent touch units are electrically connected. Further, with reference to FIGS. 1 and 4, in the second direction 02, the first electrodes 401 in two adjacent touch units 40 are insulated by providing at least one corresponding second branch electrode 202, and the second electrodes 402 in two adjacent touch units 402 are electrically connected by at least one corresponding second branch electrode 202 extending therebetween. As shown in FIG. 1, in the first direction 01, the second electrodes 402 in two adjacent touch units 40 are insulated by providing corresponding third dummy electrodes 80, and the first electrodes 401 in two adjacent touch units 40 are electrically connected by at least one corresponding first main electrode group 101 extending therebetween, wherein the third dummy electrodes 80, the first electrode groups 10, and the second electrode groups 20 are insulated.

Figure 5:
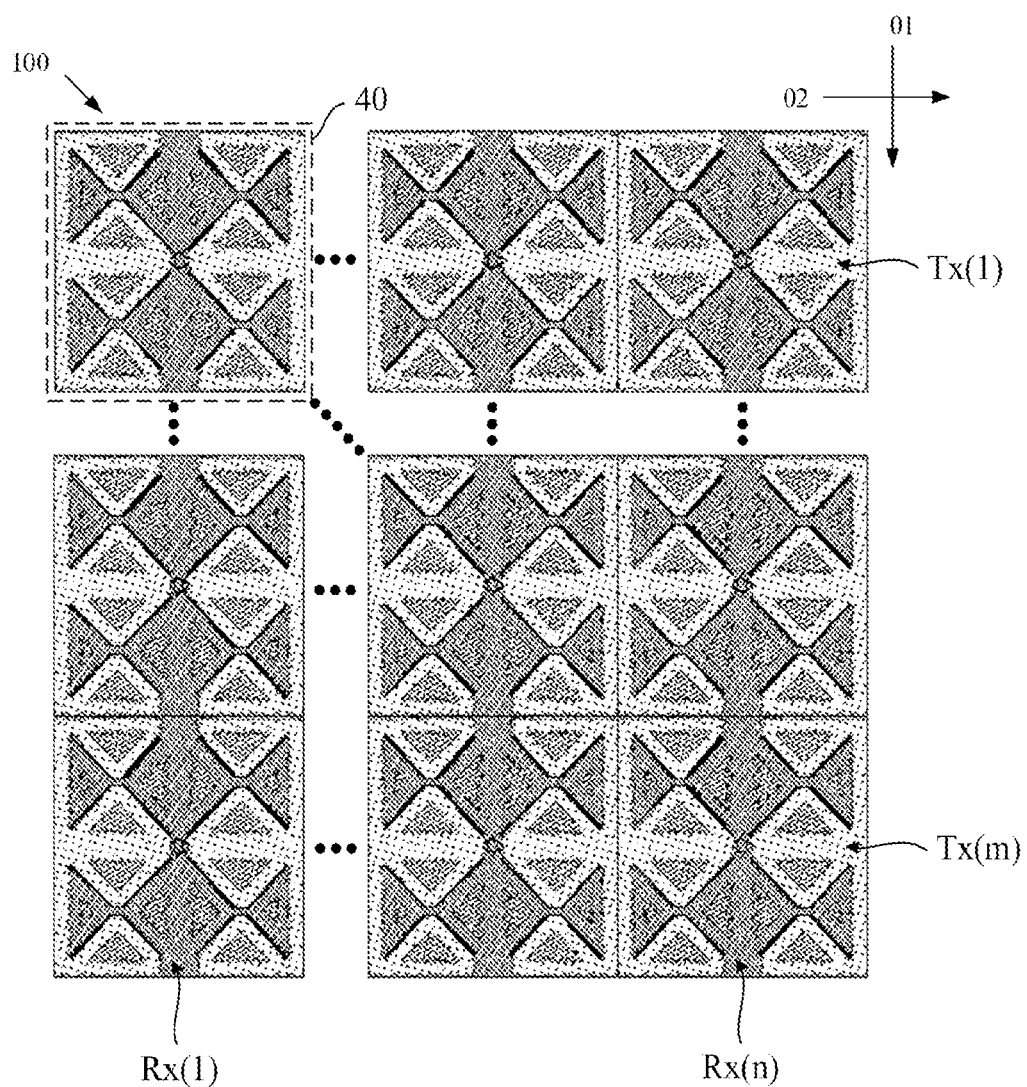
FIG. 5 is a schematic top view of a fifth embodiment of a touch layer according to an embodiment of the present disclosure.

Specifically, as shown in FIGS. 3 and 5, the first electrode group 10 of the first column is Rx(1), the first electrode group 10 of the n-th first column is Rx(n), the second electrode group 20 of the first row is Tx(1), and the second electrode group 20 of the m-th row is Tx(m).

In one embodiment, as shown in FIG. 2, each of the first electrodes 401 comprises a first main electrode 4011 and the plurality of first branch electrodes 102 connected to both sides of the first main electrode 4011, and each of the second electrodes 402 comprises a second main electrode 4021 and the plurality of second branch electrodes 202 connected to both sides of the second main electrode 4021. In each of the touch units 40, the plurality of second branch electrodes 202 are disposed around the plurality of first branch electrodes 102. Wherein, in the first direction 01, every two adjacent first main electrodes 4011 within the plurality of touch units 40 are electrically connected to form a corresponding first main electrode group 101, and in the second direction, every two adjacent second main electrodes 4021 within the plurality of touch units are electrically connected to form a corresponding second main electrode group 201.

It is understood that, in each of the touch units 40, since the first main electrode 4011 and the second main electrode 4021 extend in different directions, that is, the second main electrode 4021 cannot be disposed around the first main electrode 4011. However, both sides of the first main electrode 4011 and both sides of the second main electrode 4021 have an intersection, and it will be understood that the plurality of first branch electrodes 102 and the plurality of second branch electrodes 202 may be disposed around each other in a region defined by the first main electrode 4011, the second main electrode 4021, and adjacent two edges corresponding to the touch unit 40. For example, as shown in FIG. 2, in a region of an upper left corner of the touch unit 40, the second branch electrodes 202 may surround the first branch electrodes 102, and the second branch electrodes 202 may be further extended to surround a corresponding first main electrode 4011, thereby further increasing the facing area of the second electrodes 402 and the first electrodes 401, thereby increasing the parasitic capacitance between the second electrodes 402 and the first electrodes 401, and also effectively increasing the capacitance variation value of the parasitic capacitance between the second electrodes 402 and the first electrodes 401.

Figure 7:
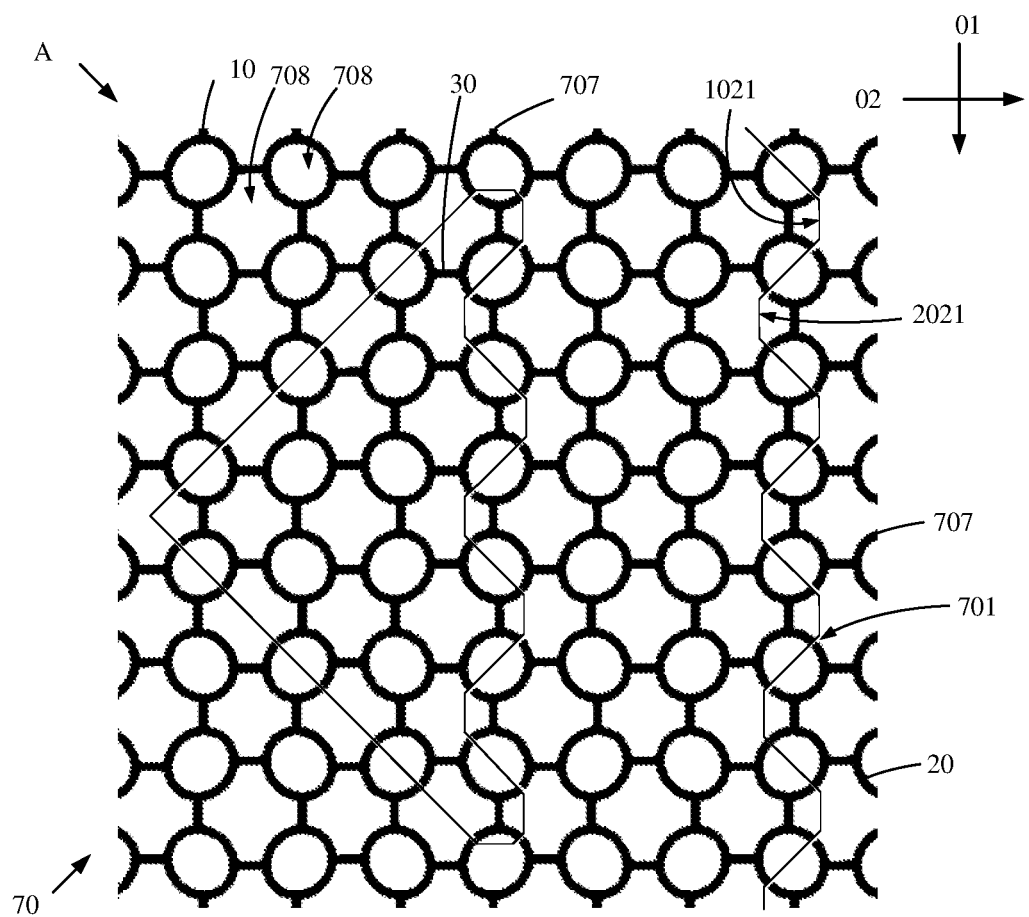
FIG. 7 is a schematic top view of a seventh embodiment of a touch layer according to an embodiment of the present disclosure.

In one embodiment, as shown in FIGS. 2 and 7, wherein FIG. 7 is an enlarged schematic diagram of an area A in FIG. 2. Each first branch electrode 102 is provided with a plurality of spaced-apart protrusions 1021 at edges thereof, and each second branch electrode 202 opposite to the first branch electrode 102 is provided with a plurality of spaced-apart recesses 2021 at edges thereof, and the recesses 2021 and the protrusions 1021 are arranged in a complementary manner. It can be understood that the plurality of protrusions 1021 may increase a path length of an edge of each first branch electrode 102, and the plurality of recesses 2021 may increase a path length of an edge of each second branch electrode 202, that is, the plurality of protrusions 1021 and the plurality of recesses 2021 effectively increase a relative path length of the edge of each first branch electrode 102 and the edge of the second branch electrode 202 disposed opposite to the first branch electrode 102, thereby increasing the facing area of each first branch electrode 102 and the second branch electrode 202 disposed opposite to the first branch electrode 102, further increasing the parasitic capacitance between the second electrodes 402 and the first electrodes 401, and also effectively increasing the capacitance variation value of the parasitic capacitance between the second electrodes 402 and the first electrodes 401.

In one embodiment, as shown in FIG. 2, in each touch unit 40, the first branch electrodes 102 extend from a corresponding first main electrode 4011 to the second direction 02, and the second branch electrodes 202 extend from a corresponding second main electrode 4021 to the first direction 01. It can be understood, in the touch units 40, since the second main electrodes 4021 extend in the second direction 02, and the first main electrodes 4011 extend in the first direction 01, that is, the first branch electrodes 102 and the second main electrodes 4021 extend in a same direction, and the second branch electrodes 202 and the first main electrodes 4011 extend in a same direction, so that the first electrodes 401 and the second electrodes 402 are distributed in both the first direction 01 and the second direction 02, uniformity of the distribution of the first electrodes 401 and the second electrodes 402 is increased, which is advantageous to maximize the facing area of the second electrodes 402 and the first electrodes 401, to increase the parasitic capacitance between the second electrodes 402 and the first electrodes 401, and to effectively increase the capacitance variation value of the parasitic capacitance between the second electrodes 402 and the first electrodes 401.

In summary, in the present disclosure, the facing area of each portion of the second electrode 402 and a corresponding portion of the first electrode 401 and a distance between each portion of the second electrode 402 and a corresponding portion of the first electrode 401 in each of the touch units 40 can be comprehensively considered, so that the parasitic capacitance of the second electrode 402 and the first electrode 401 in each of the touch units 402 is reduced relative to the prior art, and the capacitance variation value of the parasitic capacitance is increased relative to the prior art, so as to improve a ratio of the capacitance variation value of the parasitic capacitance to the parasitic capacitance, and further improve touch accuracy of the touch panel.

In one embodiment, as shown in FIG. 2, each first branch electrode 102 comprises two first sub-branch electrodes 1022 arranged axially symmetrically and connected to each other, and a symmetry axis of the two first sub-branch electrodes 1022 is parallel to the first direction 01. Further, each touch unit 40 comprises four repeating units arranged in a matrix, two of the repeating units are axially symmetric in the first direction 01 and two of the repeating units are axially symmetric in the second direction 02. Wherein each second branch electrode 202 comprises two axially symmetrical second sub-branch electrodes 2022, and a symmetry axis of the two second sub-branch electrodes 2022 is parallel to the second direction 02, the two second sub-branch electrodes 2022 are respectively located in an area defined by edges of two first sub-branch electrodes 1022 and the repeating units. Further, each second branch electrode 202 further comprises a connection electrode 2023, the connection electrode 2023 is electrically connected to two second branch electrodes 202, one end of the connection electrode 2023 is connected to one end of one of the two second sub-branch electrodes 2022 away from the first main electrode 4011, and another end of the connection electrode 2023 is connected to one end of the other second sub-branch electrode 2022 away from the first main electrode 4011.

Specifically, a shape of the first sub-branch electrodes 1022 and a shape of the second sub-branch electrodes 2022 may be same or different, and the first sub-branch electrodes 1022 will be described here as an example. An outer contour of each first sub-branch electrode 1022 may be a triangle, and a line of vertices of two triangles is perpendicular to a symmetry axis corresponding to the two triangles. Further, a shape of an outer contour of the first opening 103 located within each first sub-branch electrode 1022 may coincide with the shape of the outer contour of the first sub-branch electrode 1022, and a shape of an outer contour of the second opening 203 located within each second sub-branch electrode 2022 may coincide with the shape of the outer contour of the second sub-branch electrode 2022 to maximize sizes of the first opening 103 and the second opening 203. Wherein, an edge of the first sub-branch electrode 1022 and a corresponding edge of an oppositely disposed first dummy electrode 30 may be a folded line, and the two are complementary embedded. Similarly, an edge of each second sub-branch electrode 2022 and a corresponding edge of an oppositely disposed first dummy electrode 30 may be a folded line, and the two are complementary embedded.

In one embodiment, as shown in FIG. 2, in each touch unit 40, the second main electrode 4021 comprises two sub-electrodes 40211 located on both sides of the first main electrode 4011. The two sub-electrodes 40211 are electrically connected by a bridge portion 60 located on the first main electrode 4011, and the bridge portion 60 is insulated from the first main electrode 4011. It can be understood that, since the first main electrode 4011 extends in the first direction 01 and the second main electrode 4021 extends in the second direction 02, this embodiment can prevent an electrical connection of the first main electrode 4011 and the second main electrode 4021 by disposing the second main electrode 4021 to include two sub-electrodes 40211 located on both sides of the first main electrode 4011. Further, in this embodiment, the two sub-electrodes 40211 are electrically connected by the bridge portion 60 provided insulated from the first main electrode 4011 so that an electrical signal flows through the second main electrode 4021, and a number of the bridge portion 60 may be equal to or greater than one. As discussed above, the touch unit 40 has a central symmetrical structure, and the bridge portion 60 may be located at a center of the touch unit 40.

Figure 8:
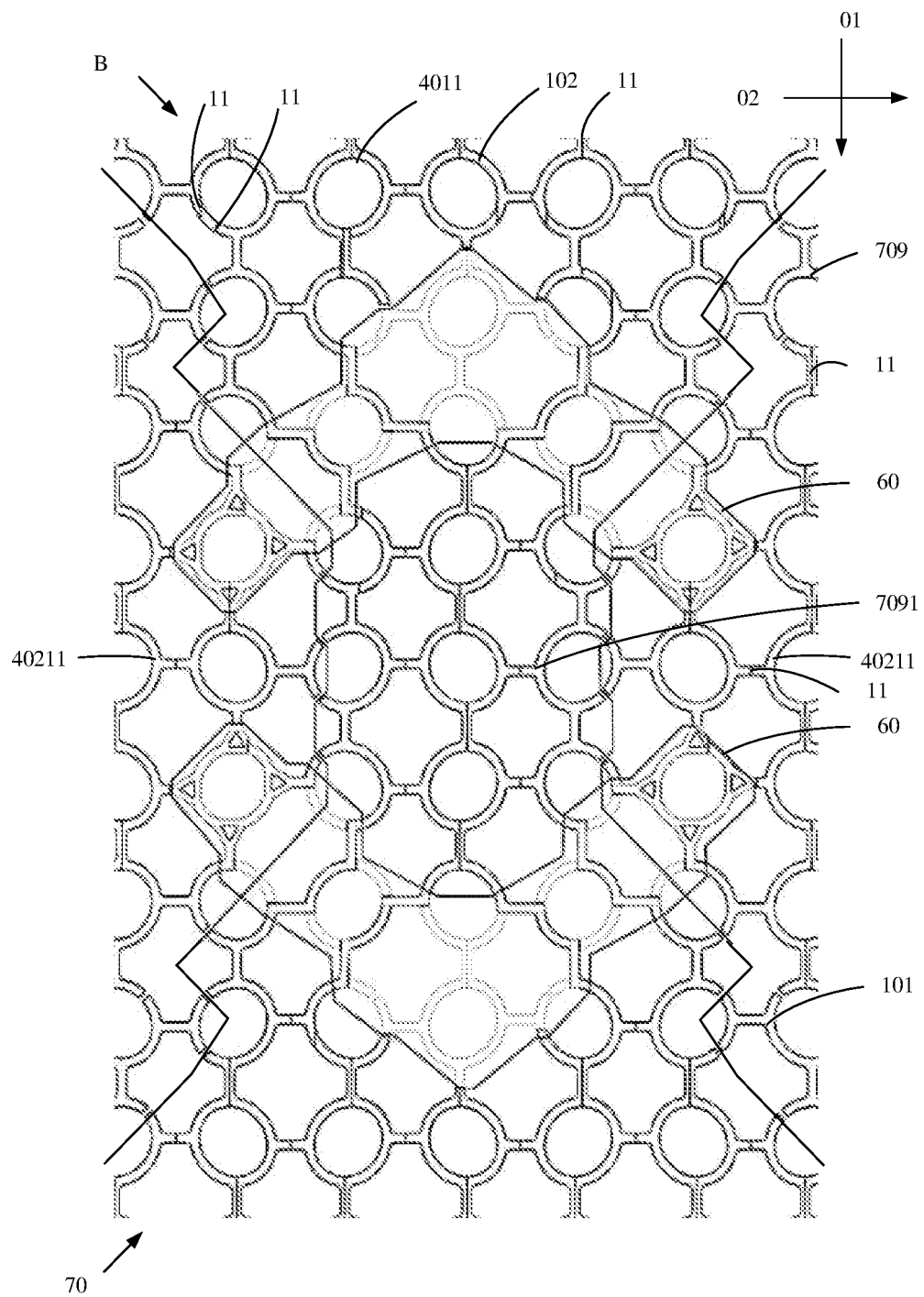
FIG. 8 is a schematic top view of an eighth embodiment of a touch layer according to an embodiment of the present disclosure.

In one embodiment, as shown in FIGS. 2 and 8, wherein FIG. 8 is an enlarged schematic diagram of an area B in FIG. 2, a width of a portion of the first main electrode 4011 intersecting the bridge portion 60 is less than a width of a portion of the first main electrode 4011 not intersecting the bridge portion 60. It should be noted that the two sub-electrodes 40211 located on both sides of the first main electrode 4011 are electrically connected through the bridge portion 60 located on the first main electrode 4011, that is, the bridge portion 60 located on the first main electrode 4011 transmits the electrical signal flowing through the second main electrode 4021, and the bridge portion 60 and the first main electrode 4011 intersect each other, and the first main electrode 4011 also transmits a corresponding electrical signal. Therefore, in the present disclosure, the width of the portion of the first main electrode 4011 intersecting the bridge portion 4011 is set to be smaller, which is equivalent to reducing an area of the first main electrode 4011 facing the bridge portion 60, thereby reducing interference between the electrical signal transmitted in the first main electrode 4011 and the electrical signal transmitted in the bridge portion 60. Similarly, since the bridge portion 60 transmits the electrical signal flowing through the second main electrode 4021, that is, the bridge portion 60 can be treated as the second main electrode 4021, this embodiment is equivalent to reduce the parasitic capacitance between the second electrode 402 and the first electrode 401, and apparently, also reduce the capacitance variation value of the parasitic capacitance between the second electrode 402 and the first electrode 401.

Specifically, for a touch unit 40 set in a manner shown in FIG. 2, the parasitic capacitance value of the first electrode 401 and the second electrode 402 may be 0.289 pf when a finger does not touch the touch unit 40, and the parasitic capacitance value of the first electrode 401 and the second electrode 402 may be 0.351 pf when the finger touches the touch unit 40, that is, the parasitic capacitance variation value of the first electrode 401 and the second electrode 402 may be 0.062 pf, that is, the ratio of the parasitic capacitance variation value to the parasitic capacitance value may be 17.66%. For a conventional touch unit, when the finger does not touch the conventional touch unit, the parasitic capacitance value of a driving electrode and a sensing electrode in the conventional touch unit may be 0.69 pf, and when the finger touches the touch unit, the parasitic capacitance value of the driving electrode and the sensing electrode in the conventional touch unit may be 0.74 pf, that is, the parasitic capacitance variation value of the driving electrode and the sensing electrode in the conventional touch unit may be 0.05 pf, that is, the ratio of the parasitic capacitance variation value to the parasitic capacitance value may be 6.76%.

As described above, in each touch unit 40 set in the manner shown in FIG. 2, with respect to the conventional touch unit, the parasitic capacitance values of the driving electrode and the sensing electrode can be reduced by 0.389, and the parasitic capacitance variation value of the driving electrode and the sensing electrode can be increased by 0.012 pf when the finger touches the conventional touch unit. Therefore, this embodiment can realize that the first electrode 401 and the second electrode 402 have relatively small parasitic capacitance value and a large parasitic capacitance variation value, thereby improving the ratio of the parasitic capacitance variation value to the parasitic capacitance value, and further improving the touch accuracy of the touch panel.

In one embodiment, as shown in FIGS. 1, 2, 6, and 7, the first electrode groups 10 and the second electrode groups 20 are formed of a metal grid 70, and the first electrode groups 10 are disposed insulated from the second electrode groups 20 through fractures 701 of the metal grid 70. It can be understood that the formation of the first electrode groups 10 and the second electrode groups 20 using the metal grid 70 makes it possible to make constituent materials and unit structures of the first electrode groups 10 and the second electrode groups 20 same. It can be seen from the above analysis, this can reduce a difference of film layer structures in different areas inside the first electrode groups 10 and the second electrode groups 20, so as to maintain uniformity of light output of sub-pixels in different areas. Specifically, the fractures 701 can be understood as an edge of the metal grid 701, a distance between adjacent two fractures 701 is sufficient to insulate both. Specifically, the fractures 701 in the first electrode group 10 extend away from the second electrode groups 20 to form a loop as the first electrode groups 10.

Figure 6:
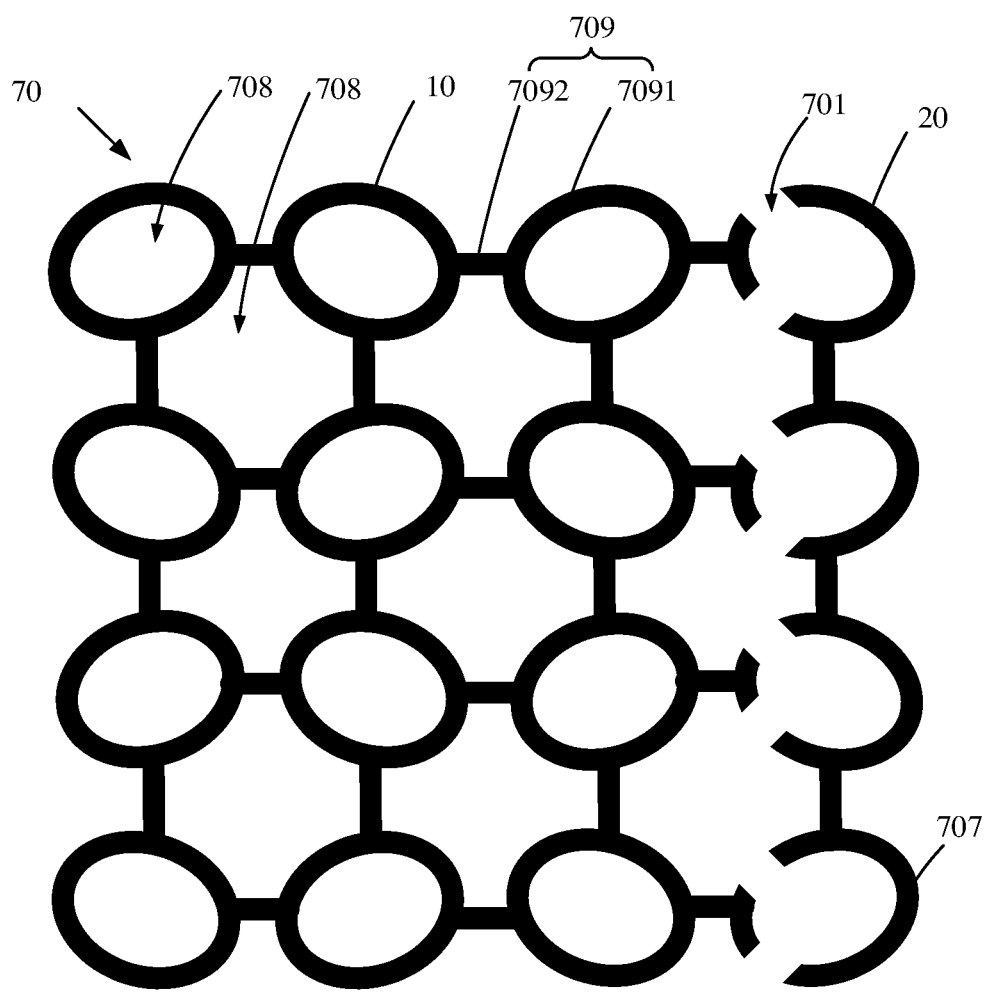
FIG. 6 is a schematic top view of a sixth embodiment of a touch layer according to an embodiment of the present disclosure.

Further, as shown in FIG. 6, the metal grid 70 may comprise metal structures 709 and a plurality of hollowed-out areas 708 surrounded by the metal structures 709. In addition, each of the metal structures 709 may comprise a closed metal frame 7091 and metal connection lines 7092 connected between two metal frames 7091, and the metal connection lines 7092 electrically connect corresponding two metal frames 7091. Wherein a projection of the metal structure 709 on the cathode layer may be, but is not limited to, an ellipse, a circle, or a rectangular frame. As shown in FIG. 6, sides of the metal frames 7091 at edge of the metal grids 70 may form a boundary seal 707 of the metal grid 70. As shown in FIGS. 6 and 7, the boundary seal 707 may also be formed by metal connection lines 7092 located at an edge of the metal grid 70 or by fragmented seal of the fragmented metal frames 7091. Wherein, as shown in FIGS. 6 to 9, each of the hollowed-out areas 708 may be disposed opposite to one of the sub-pixels, and an edge of the sub-pixel does not exceed a corresponding hollowed-out area 708, so that the metal grid 70 may prevent blocking any one of the sub-pixels to reduce an amount of light emitted by the display panel.

Further, as shown in FIG. 7, a maximum size of the protrusions 1021 in a protruding direction is not less than a size of the sub-pixel. As shown in FIGS. 6 and 7, the first electrode groups 10 are insulated from the second electrode group 20 by the fractures 701, the hallowed-out areas 708 and the corresponding sub-pixels are arranged opposite to each other. In this description, each sub-pixel is circular or square as an example. When two fractures 701 are located at two opposite positions in the metal frame 7091, that is, a distance between a highest point of the protrusions 1021 and a non-protruding area may be equal to a diameter or a side length of one of the sub-pixels. Apparently, when a size of the protrusions 1021 in the protruding direction increases, a bite depth of the second electrode 402 and the first electrode 401 increases, as shown in FIGS. 2 and 7, thereby increasing the facing area of the first branch electrode 102 and the second branch electrode 202 disposed opposite to the first branch electrode 102, further increasing the parasitic capacitance between the second electrode 402 and the first electrode 401, and effectively increasing the parasitic capacitance variation value of the parasitic capacitance between the second electrode 402 and the first electrode 401.

Figure 9:
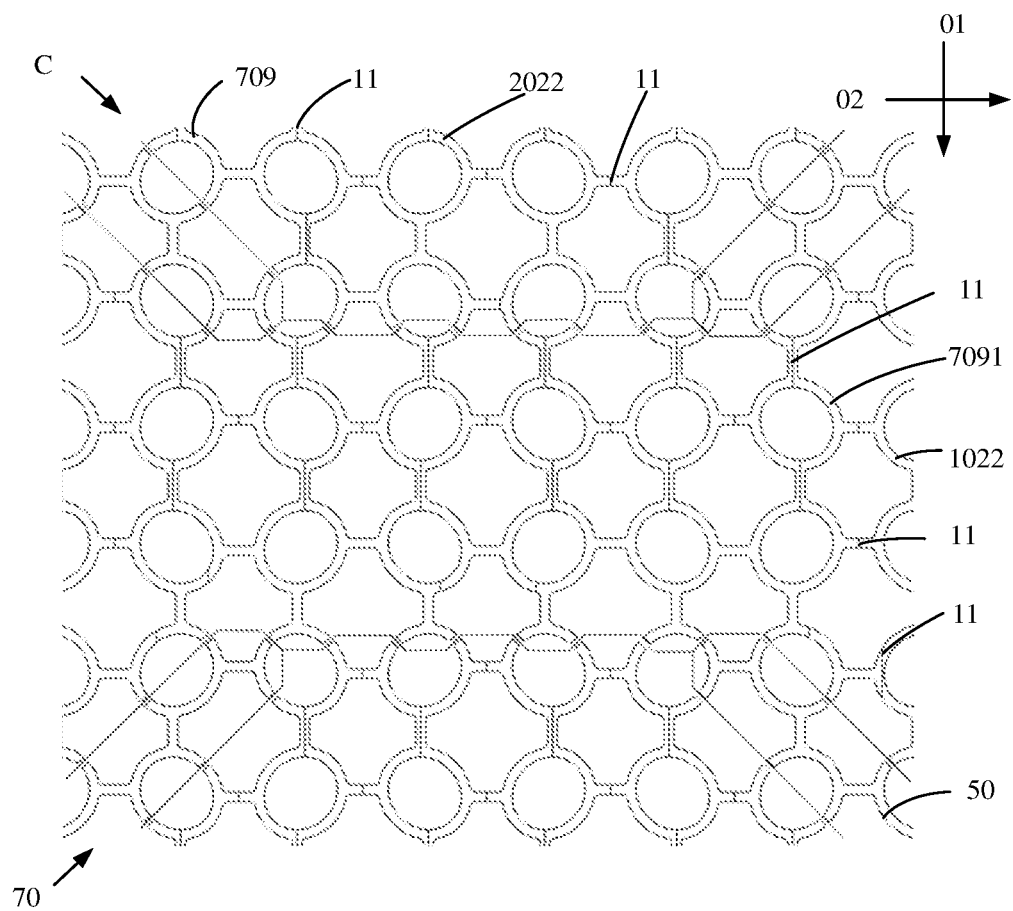
FIG. 9 is a schematic top view of a ninth embodiment of a touch layer according to an embodiment of the present disclosure.

In one embodiment, as shown in FIGS. 1, 2, 8, and 9, wherein FIG. 9 is an enlarged schematic diagram of an area C in FIG. 2, a minimum value of a width of the first branch electrodes 102 and a minimum value of a width of the second branch electrodes 202 are both greater than a size of two sub-pixels. Specifically, as discussed above, as shown in FIG. 2 and FIG. 8, a width of a portion of the first main electrode 4011 intersecting the bridge portion 60 is also relatively small, i.e., in the second direction 02, the portion of the first main electrode 4011 intersecting the bridge portion 60 may comprise a complete metal frame 7091 located in a middle and two non-complete metal frames 7091 located on both sides. Further, as shown in FIGS. 2 and 9, it can be seen from the above discussion that a connection portion of the two triangular first sub-branch electrodes 1022 need to be provided smaller, that is, in the first direction 01, the connection portion of the two triangular first sub-branch electrodes 1022 may comprise two complete metal frames 7091 located in the middle and two non-complete metal frames 7091 located on the both sides. However, if the minimum value of the width of the first branch electrodes 102 and the minimum value of the width of the second branch electrodes 202 are set to be smaller, when cracks are generated in the first branch electrodes 102 and the second branch electrodes 202, a crack extension path is relatively short, which easily causes the first branch electrodes 102 and the second branch electrodes 202 to be disconnected, and therefore, a risk of the disconnection of the first branch electrodes 102 and the second branch electrodes 202 can be reduced by setting the minimum value of the width of the first branch electrodes 102 and the minimum value of the width of the second branch electrodes 202 to be larger than the size of two sub-pixels on the premise that the above-described functions are achieved.

It is to be noted that a plurality of auxiliary lines 11 indicated in FIGS. 8 and 9 located inside the metal structures 709 are merely intended to facilitate drawing of the metal grid 70 and do not actually exist in the metal structures 709 to constitute the metal grid 70, that is, as shown in FIG. 6 an FIG. 7, the metal grid 70 may actually consist of the metal structures 709, the plurality of the hollow-out areas 708 surrounded and formed by the metal structures 709, and the formed fractures 701, wherein each metal structure 709 may comprise the closed metal frame 7091 and the metal connection lines 7092 connected between two metal frames 7091.

In an embodiment, as shown in FIG. 1, the touch layer 100 further comprises at least one first dummy electrode 30, and the first dummy electrode 30 is inside at least one of at least one first opening 103 or at least one second opening 203. The first dummy electrode 30 is insulated from the plurality of first electrode groups 10 and the plurality of second electrode groups 20. Specifically, in the present embodiment, at least one of at least one first opening 103 and at least one second opening 203 is provided with the first dummy electrode 30. The first dummy electrode 30 is insulated from the plurality of first electrode groups 10 and the plurality of second electrode groups 20. Specifically, composition materials and a minimum unit of the first dummy electrode 30 located in at least one first opening 103 and the at least one second opening 203 may be same as the plurality of first electrode groups 10 and the plurality of second electrode groups 20, so as to reduce a difference in a film layer structure in different areas of the first electrode groups 10, the second electrode groups 20, and the first dummy electrode 30, and maintain uniformity of light output from sub-pixels in different areas. It can be understood that electrical signals may not be loaded in the first dummy electrode 30 to reduce an effect of electrical signals on the first electrode groups 10 and on the second electrode groups 20. It can be understood that in this embodiment, at least one of at least one first opening 103 and at least one second opening 203 is provided with the first dummy electrode 30. The first dummy electrode 30 is insulated from the plurality of first electrode groups 10 and the plurality of second electrode groups 20, so that the difference in the film structure of different areas in the first electrode groups 10, the second electrode groups 20, and the first dummy electrode 30 can be reduced, and the uniformity of the light output of the sub-pixels in different areas can be maintained.

In an embodiment, as shown in FIGS. 1 and 2, the touch layer 100 further comprises at least one second dummy electrode 50, the second dummy electrode 50 is disposed between at least one of the second branch electrodes 202 and at least one of the first branch electrodes 102 disposed oppositely, and the second dummy electrode 50 is insulated from the plurality of first electrode groups and the plurality of second electrode groups. Since any one of the second electrode groups 20 and any one of the first electrode groups 10 intersect and are insulated, any one of the second branch electrodes 202 and any one of the first branch electrodes 102 are also insulated. Specifically, in this embodiment, the second dummy electrode 50 is disposed between at least one of the second branch electrodes 202 and at least one of the first branch electrodes 102 disposed oppositely, a distance between a corresponding second branch electrode 202 and a corresponding first branch electrode 102 can be effectively increased, signal interference between the first branch electrode 102 and the second branch electrode 202 can be reduced, the parasitic capacitance between the second electrode 402 and the first electrode 401 can be reduced, and surely the parasitic capacitance variation value between the second electrode 402 and the first electrode 401 can be reduced. Further, the composition materials and the minimum unit of the second dummy electrode 50 may be same as the plurality of first electrode groups 10 and the plurality of second electrode groups 20, and the difference of the film layer structures in different regions inside the first electrode groups 10, the second electrode groups 20, and the first dummy electrode 30 may be reduced to maintain the uniformity of the light output from the sub-pixels in different areas.

At the same time, the second dummy electrode 50 may occupy a part of an area of the touch layer 100. On another hand, a total area of the first electrodes 401 and the second electrodes 402 is correspondingly reduced. Therefore, a projected area of the plurality of first electrodes 401 and the plurality of second electrodes 402 on the cathode layer is relatively reduced. That is, a sum of the facing areas of the plurality of first electrodes 401, the plurality of second electrodes 402, and the cathode layer is reduced, which can reduce the parasitic capacitance between the plurality of first electrodes 401, the plurality of second electrodes 401, and the cathode layer, thereby reducing the RC loading of the plurality of first electrode groups 10 and the plurality of second electrode groups 20, and alleviating the electrical signal attenuation on the plurality of first electrode groups 10 and the plurality of second electrode groups 20.

Further, the first dummy electrode 30 and the second dummy electrode 50 may also be constituted by the metal grid 70, details may refer to related description of the metal grid 70 above. Similarly, the first dummy electrode 30 is disposed insulated from at least one of the first electrode groups 10 or the second electrode groups 20 through the fractures 701 of the metal grid 70, and the second dummy electrode 50 is disposed insulated from at least one of the first electrode groups 10 and the second electrode groups 20 through the fractures 701 of the metal grid 70. Similarly, the composition materials and unit structures of the first electrode groups 10, the second electrode groups 20, the first dummy electrode 30, and the second dummy electrode 50 can be made the same. According to the above analysis, it is possible to reduce the difference of the film layer structures of different areas in the first electrode groups 10, the second electrode groups 20, the first dummy electrode 30, and the second dummy electrode 50, and further maintain the uniformity of the light output from the sub-pixels in the different areas.

The present disclosure further provides a mobile terminal comprising a terminal body and a touch panel as described above, and the terminal body and the touch panel are integrated.

The touch panel and the mobile terminal provided in embodiments of the present disclosure, the touch panel comprises the plurality of first electrode groups and the plurality of second electrode groups, the plurality of first electrode groups extend in the first direction and arranged in the second direction, each of the first electrode groups comprises the first main electrode group and the plurality of first branch electrodes connected to two sides of the first main electrode group, the plurality of second electrode groups extend in the second direction and arranged in the first direction, any one of the second electrode groups and any one of the first electrode groups intersect and are insulated, each of the second electrode groups comprises the second main electrode group and the plurality of second branch electrodes connected to two sides of the second main electrode group. In the embodiments, the first opening is provided in at least one of the first branch electrodes, and the second opening is provided in at least one of the second branch electrodes, so that the total facing area of the first electrode groups, the second electrode groups, and the cathode layer is reduced, so that the parasitic capacitance between the first electrode groups, the second electrode groups, and the cathode layer is reduced, the RC loading of the first electrode groups and the second electrode groups is reduced, the electrical signal attenuation on the first electrode groups and the second electrode groups is alleviated, and the reliability of the touch panel operation is improved.

It will be understood that those skilled in the art may make equivalent replacements or changes in accordance with the technical solutions of the present disclosure and the inventive concepts thereof, all of which shall fall within the scope of the claims appended hereto.

What is claimed is:

1. A touch panel, comprising a touch layer, wherein the touch layer comprises:
a plurality of first electrode groups extending in a first direction and arranged in a second direction, wherein each of the first electrode groups comprises a first main electrode group and a plurality of first branch electrodes connected to two sides of the first main electrode group, and at least one of the first branch electrodes is provided with a first opening; and
a plurality of second electrode groups extending in the second direction and arranged in the first direction, wherein any one of the second electrode groups and any one of the first electrode groups intersect and are insulated, each of the second electrode groups comprises a second main electrode group and a plurality of second branch electrodes connected to two sides of the second main electrode group, and at least one of the second branch electrodes is provided with a second opening;
wherein the plurality of first branch electrodes extend in the second direction, and a size of the first branch electrodes along the first direction in a direction away from the first main electrode group sequentially assume a decreasing trend and an increasing trend,
wherein an edge of each of the first branch electrodes is provided with a plurality of protrusions arranged at intervals, an edge of each of the second branch electrodes disposed opposite to the first branch electrode is provided with a plurality of recesses arranged at intervals, and the plurality of recesses and the plurality of protrusions are arranged in a complementary manner, and
wherein a maximum size of the protrusions in a protruding direction is not less than a size of one sub-pixel.

2. The touch panel according to claim 1, wherein the plurality of first electrode groups and the plurality of second electrode groups intersect to form a plurality of touch units, the plurality of touch units are arranged in the first direction and the second direction, and each of the touch units comprises a first electrode and a second electrode, and the second electrode is disposed around the first electrode;
in the first direction, every two adjacent first electrodes within the plurality of touch units are electrically connected to form a corresponding first electrode group, and two second electrodes within two adjacent touch units are insulated;
in the second direction, every two adjacent second electrodes within the plurality of touch units are electrically connected to form a corresponding second electrode group, and two first electrodes within two adjacent touch units are insulated.

3. The touch panel according to claim 2, wherein each first electrode comprises a first main electrode and the plurality of first branch electrodes connected to both sides of the first main electrode, and the second electrode comprises a second main electrode and the plurality of second branch electrodes connected to both sides of the second main electrode; and
in each of the touch units, the plurality of second branch electrodes are disposed around the plurality of first branch electrodes.

4. The touch panel according to claim 3, wherein in each of the touch units, each of the first branch electrodes extends from a corresponding first main electrode to the second direction, and each of the second branch electrodes extends from a corresponding second main electrode to the first direction.

5. The touch panel according to claim 3, wherein each of the first branch electrodes comprises two first sub-branch electrodes axially symmetrical and connected to each other, and a symmetry axis of the two first sub-branch electrodes is parallel to the first direction.

6. The touch panel according to claim 5, wherein each of the touch units comprises four repeating units arranged in a matrix, two repeating units in the first direction are axially symmetrical, and two repeating units in the second direction are axially symmetric;
wherein each of the second branch electrodes comprises two second sub-branch electrodes axially symmetrical, a symmetry axis of the two second sub-branch electrodes is parallel to the second direction, the two second sub-branch electrodes are respectively located in an area defined by edges of the two first sub-branch electrodes and the repeating units, and each of the second branch electrodes further comprises:
a connection electrode, wherein one end of the connection electrode is connected to one end of one of the second sub-branch electrodes away from the first main electrode, and another end of the connection electrode is connected to one end of another one of the second sub-branch electrodes away from the first main electrode.

7. The touch panel according to claim 3, wherein in each of the touch units, the second main electrode comprises two sub-electrodes located on both sides of the first main electrode, the two sub-electrodes are electrically connected by a bridge portion located on the first main electrode, and the bridge portion is insulated from the first main electrode.

8. The touch panel according to claim 7, wherein a width of a portion of the first main electrode that intersects the bridge portion is less than a width of a portion of the first main electrode that does not intersect the bridge portion.

9. The touch panel according to claim 2, wherein a minimum value of widths of the first branch electrodes and a minimum value of widths of the second branch electrodes are both greater than a size of two sub-pixels.

10. The touch panel according to claim 1, wherein the touch layer further comprises:
    at least one first dummy electrode, wherein at least one of at least one first opening or at least one second opening is provided with the first dummy electrode, and the first dummy electrode is insulated from the plurality of first electrode groups and the plurality of second electrode groups.

11. The touch panel according to claim 10, wherein the touch layer further comprises:
    at least one second dummy electrode, wherein the second dummy electrode is disposed between the at least one of the first branch electrodes and the at least one of the second branch electrodes, and the second dummy electrode is insulated from the plurality of first electrode groups and the plurality of second electrode groups.

12. The touch panel according to claim 1, wherein the first electrode groups and the second electrode groups are formed of a metal grid, and the first electrode groups are insulated from the second electrode groups through fractures of the metal grid.

13. A mobile terminal, wherein the mobile terminal comprises a terminal body and a touch panel, wherein the terminal body and the touch panel are integrated, and the touch panel comprises a touch layer, and the touch layer comprises:
    a plurality of first electrode groups extending in a first direction and arranged in a second direction, wherein each of the first electrode groups comprises a first main electrode group and a plurality of first branch electrodes connected to two sides of the first main electrode group, and at least one of the first branch electrodes is provided with a first opening; and
    a plurality of second electrode groups extending in the second direction and arranged in the first direction, wherein any one of the second electrode groups and any one of the first electrode groups intersect and are insulated, each of the second electrode groups comprises a second main electrode group and a plurality of second branch electrodes connected to two sides of the second main electrode group, and at least one of the second branch electrodes is provided with a second opening;
    wherein the plurality of first branch electrodes extend in the second direction, and a size of the first branch electrodes along the first direction in a direction away from the first main electrode group sequentially assume a decreasing trend and an increasing trend,
    wherein an edge of each of the first branch electrodes is provided with a plurality of protrusions arranged at intervals, an edge of each of the second branch electrodes disposed opposite to the first branch electrodes is provided with a plurality of recesses arranged at intervals, and the plurality of recesses and the plurality of protrusions are arranged in a complementary manner, and
    a maximum size of the protrusions in a protruding direction is not less than a size of one sub-pixel.

14. The mobile terminal according to claim 13, wherein the plurality of first electrode groups and the plurality of second electrode groups intersect to form a plurality of touch units, the plurality of touch units are arranged in the first direction and the second direction, each of the touch units comprises a first electrode and a second electrode, and the second electrode is disposed around the first electrode;
    in the first direction, every two adjacent first electrodes within the plurality of touch units are electrically connected to form a corresponding first electrode group, and two second electrodes within two adjacent touch units are insulated; and
    in the second direction, every two adjacent second electrodes within the plurality of touch units are electrically connected to form a corresponding second electrode group, and two first electrodes within two adjacent touch units are insulated.

15. The mobile terminal according to claim 14, wherein each first electrode comprises a first main electrode and the plurality of first branch electrodes connected to both sides of the first main electrode, and the second electrode comprises a second main electrode and the plurality of second branch electrodes connected to both sides of the second main electrode; and
    in each of the touch units, the plurality of second branch electrodes are disposed around the plurality of first branch electrodes.

16. The mobile terminal according to claim 15, wherein in each of the touch units, each of the first branch electrodes extends from a corresponding first main electrode to the second direction, and each of the second branch electrodes extends from a corresponding second main electrode to the first direction.

17. The mobile terminal according to claim 15, wherein each of the first branch electrodes comprises two first sub-branch electrodes axially symmetrical and connected to each other, and a symmetry axis of the two first sub-branch electrodes is parallel to the first direction.

18. A touch panel, comprising a touch layer, wherein the touch layer comprises:
    a plurality of first electrode groups extending in a first direction and arranged in a second direction, wherein each of the first electrode groups comprises a first main electrode group and a plurality of first branch electrodes connected to two sides of the first main electrode group, and at least one of the first branch electrodes is provided with a first opening; and
    a plurality of second electrode groups extending in the second direction and arranged in the first direction, wherein any one of the second electrode groups and any one of the first electrode groups intersect and are insulated, each of the second electrode groups comprises a second main electrode group and a plurality of second branch electrodes connected to two sides of the second main electrode group, and at least one of the second branch electrodes is provided with a second opening;
    wherein the plurality of first branch electrodes extend in the second direction, and a size of the first branch electrodes along the first direction in a direction away from the first main electrode group sequentially assume a decreasing trend and an increasing trend, wherein the plurality of first electrode groups and the plurality of second electrode groups intersect to form a plurality of touch units, the plurality of touch units are arranged in the first direction and the second direction, and each of the touch units comprises a first electrode and a second electrode, and the second electrode is disposed around the first electrode;

in the first direction, every two adjacent first electrodes within the plurality of touch units are electrically connected to form a corresponding first electrode group, and two second electrodes within two adjacent touch units are insulated;

in the second direction, every two adjacent second electrodes within the plurality of touch units are electrically connected to form a corresponding second electrode group, and two first electrodes within two adjacent touch units are insulated, wherein a minimum value of widths of the first branch electrodes and a minimum value of widths of the second branch electrodes are both greater than a size of two sub-pixels.

* * * * *